Nov. 4, 1969

D. L. VE NARD 3,477,010

SYNTHETIC WAVE THREE PHASE ALTERNATING
CURRENT POWER SUPPLY SYSTEM

Filed April 11, 1967

AC POWER SUPPLY SYSTEM

TWO CHANNEL 3∅ POWER INVERTER

INVENTOR,
DAN L. VE NARD

BY
Richard A. Marsa
ATTORNEY

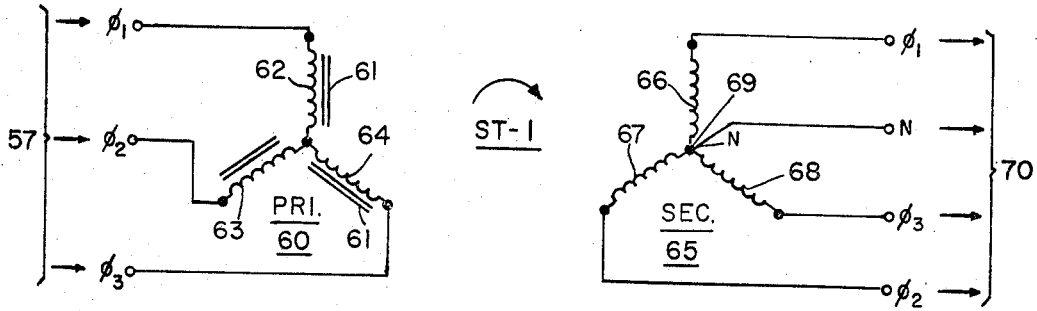
FIG. 3 SUMMING TRANSFORMER ST-1 (3∅)
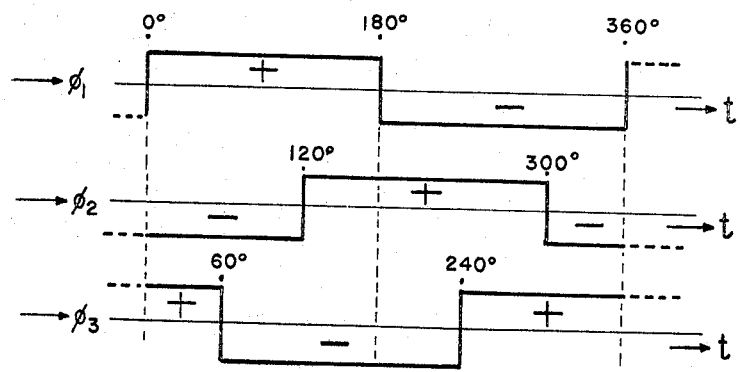
FIG. 4 SCR CONDUCTION TO PRIMARY OF ST-1 (3∅)
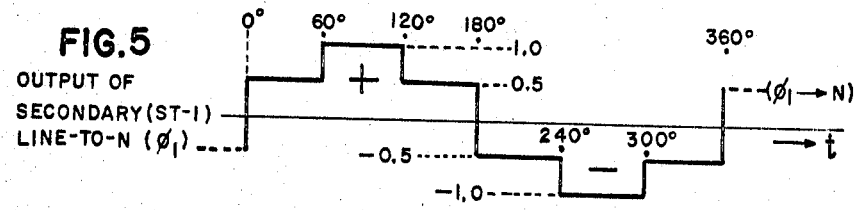
FIG. 5
OUTPUT OF
SECONDARY (ST-1)
LINE-TO-N (∅₁)
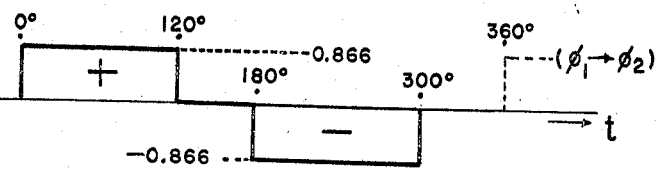
FIG. 6
OUTPUT OF
SECONDARY (ST-1)
LINE-TO-LINE
(∅₁ → ∅₂)

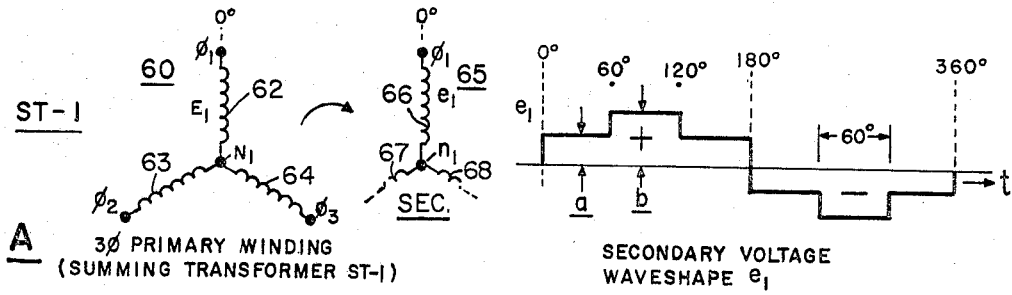
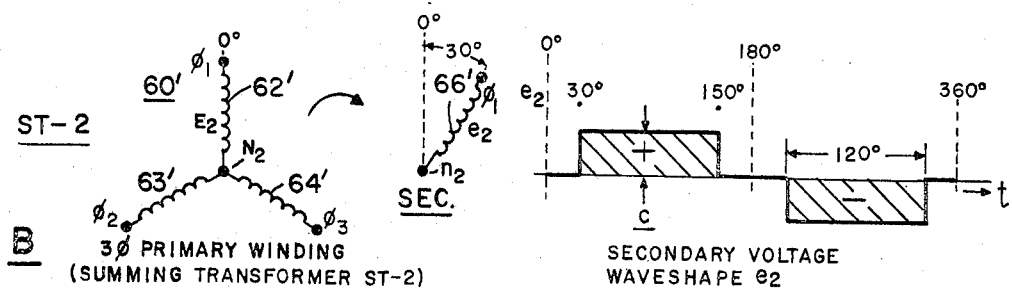
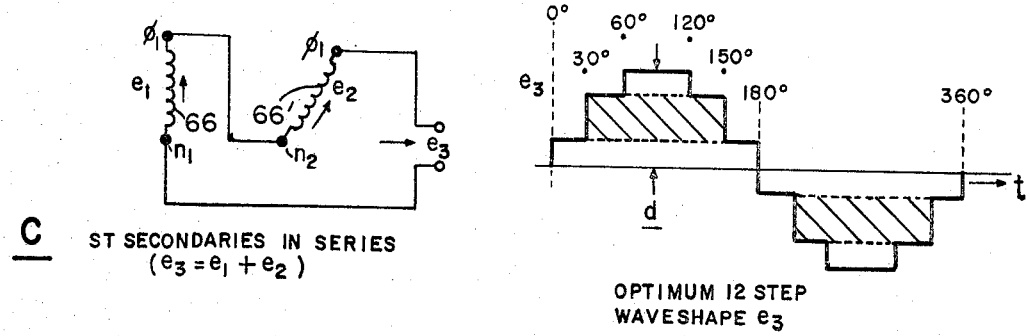
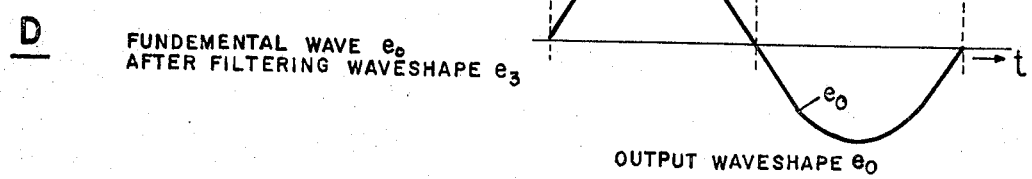
FIG. 7 WAVEFORM CONSTRUCTION OF TWO-CHANNEL INVERTER (3∅)

INVENTOR,
DAN L. VE NARD

BY *Richard A. Marra*
ATTORNEY

INVENTOR,
DAN L VE NARD

Nov. 4, 1969

D. L. VE NARD 3,477,010

SYNTHETIC WAVE THREE PHASE ALTERNATING
CURRENT POWER SUPPLY SYSTEM

Filed April 11, 1967

INVENTOR,
DAN L. VE NARD

BY
*Richard Q. Marsen*
ATTORNEY.

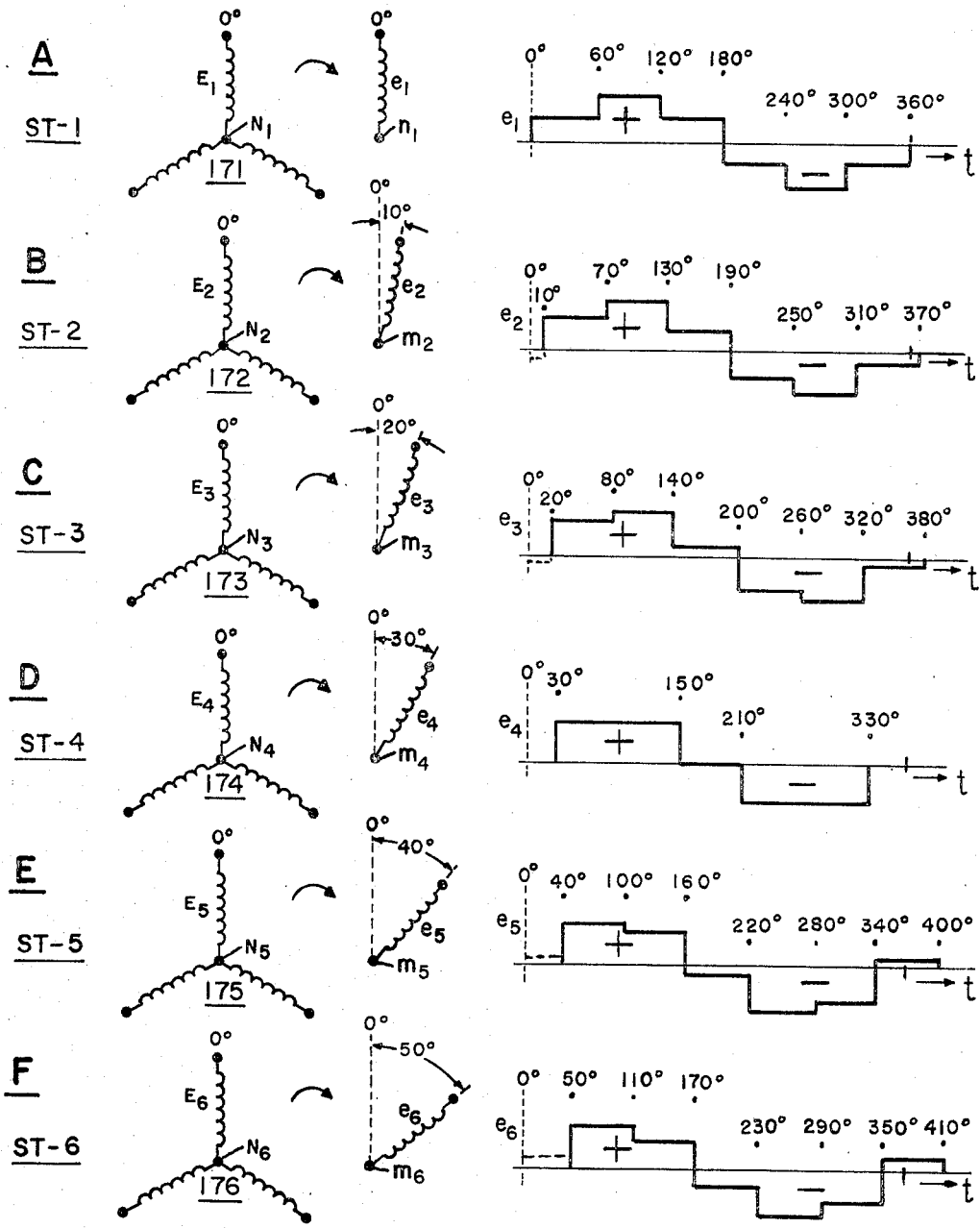
FIG.18  WAVEFORM COMPONENTS OF SIX CHANNEL INVERTER (3∅)

Nov. 4, 1969  D. L. VE NARD  3,477,010
SYNTHETIC WAVE THREE PHASE ALTERNATING
CURRENT POWER SUPPLY SYSTEM
Filed April 11, 1967  9 Sheets-Sheet 9
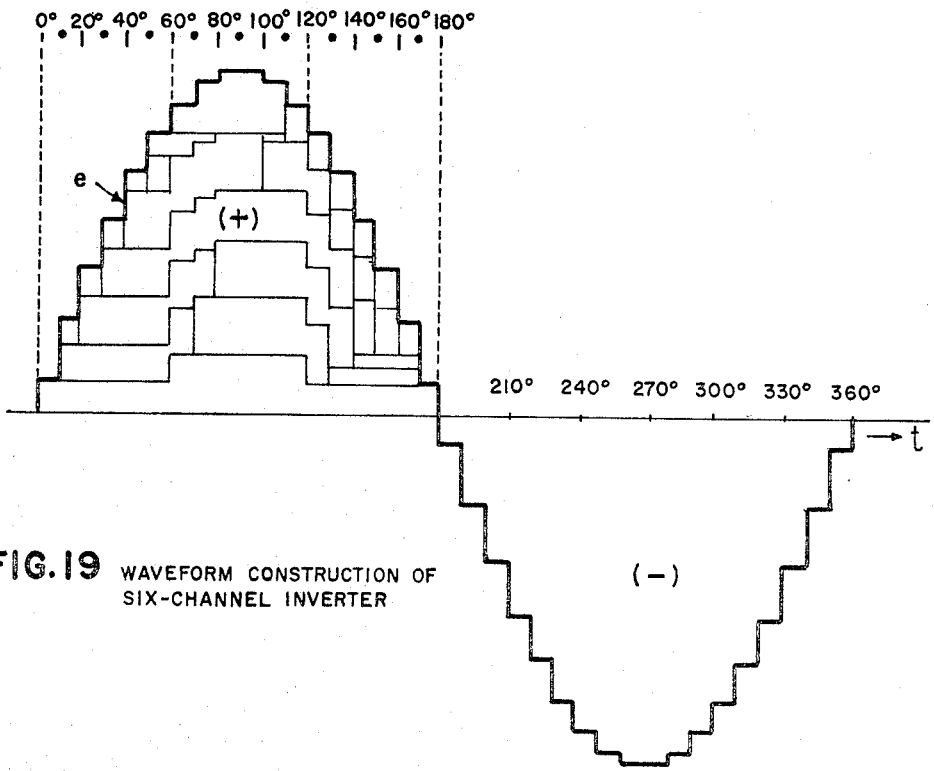
FIG.19 WAVEFORM CONSTRUCTION OF SIX-CHANNEL INVERTER
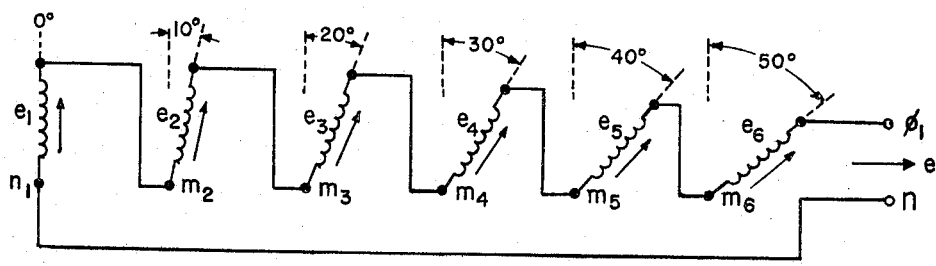
FIG.20 SIX-CHANNEL SIGNAL SUMMATION (3∅)
INVENTOR,
DAN L. VE NARD
BY
ATTORNEY

United States Patent Office 3,477,010
Patented Nov. 4, 1969

3,477,010
SYNTHETIC WAVE THREE PHASE ALTERNATING CURRENT POWER SUPPLY SYSTEM
Dan L. Ve Nard, Wyoming, Mich., assignor to Lear Jet Industries, Inc., Wichita, Kans., a corporation of Delaware
Filed Apr. 11, 1967, Ser. No. 630,061
Int. Cl. H02m 7/02
U.S. Cl. 321—5                                            11 Claims

ABSTRACT OF THE DISCLOSURE

A polyphase static power inverter system that converts direct current to polyphase alternating current, at a predetermined frequency. A plurality of polyphase inverters each with silicon controlled rectifiers provide square waveform trains as polyphase sets to associated polyphase transformers. The polyphase signal sets are respectively displaced in predetermined time-phase relation. The secondary windings of the transformers are interconnected in series-add relation as output-phase groups, in polyphase array. Further, space-phasing of the secondary windings with respect to their associated primary windings reduces the harmonic content of the system output. High power conversion efficiency with low filtering requirement, provides effective 400 cycle three-phase power for large aircraft.

---

This invention relates generally to static power inverters, and more particularly to novel inverter systems which utilize output transformers that directly construct multi-stepped waveforms of a desired basic frequency. The inverter system hereof may be used to provide single or polyphase alternating current, for mobile or stationary installations.

The invention inverter is relatively simple, efficient and rugged; and lends itself to substantial power ratings with negligible harmonic content. It is particularly suited as the fixed-frequency source aboard aircraft and missiles. Its output frequency may be precisely maintained, and thereby improve the performance of navigational and other fixed-frequency instruments and equipment. Primary power is obtained from practical alternators directly driven by the engines. The initial high cost and the troublesome maintenance of constant speed drives for maintaining alternator frequency, are avoided. The varying or "wild" frequency power thus provided is rectified to supply the inverters hereof. A substantial portion of the alternator power may be directly utilized for other electrical power requirements aboard, as a system advantage. Such include heating, lighting and deicing apparatus.

Polyphase inverter embodiments of the invention yield better economy of size, weight and cost as compared to single phase versions. For a given overall power output, components of the inverter hereof such as the silicon controlled rectifiers, are more economical in the polyphase array. Further, a plurality of phase-related channels are herein arranged in series to provide rated power output. This feature correspondingly reduces the voltage and power ratings of individual channel components, enhancing the reliability and reducing the cost of the invention inverter. In addition, the resultant multi-stepped waveforms contain fewer harmonics as the number of channels of the inverter are increased, as will be described in detail hereinafter.

The silicon controlled rectifiers are arranged in groups or banks, in interrelated channels. These SCR banks essentially convert direct current power input into outputs with square waveform voltages of predetermined duration, sequence and phase to associated transformers. Efficient conversion thereof into A.C. power of stepped waveform is effected with the polyphase iron-cored transformers hereof, which power is readily filtered to low harmonic content. An important advantage of the invention system is the resultant firm stability of operation of its silicon controlled rectifiers over wide power and power factor ranges. This is due to the relative electrical isolation established for the basic SCR bank of each channel: (a) from inductive load factors, by its transformer; and (b), from generator and cable inductance, by its D.C. supply rectifier.

Cycloconverters have no such inductive reaction protection at the input or output of their SCR groups. Inductive reaction onto their silicon controlled rectifiers inherently results in power conversion losses. Also, their output currents are formed of many small pieces, and cannot be economically filtered. Costly cable shielding is needed to prevent radiated RF interference. This adds materially to the weight and cost of cycloconverter installations. Further, cycloconverters require input power at a frequency that is at least three times that of its output frequency, to avoid voltage and frequency modulation. Their generators thus are driven at relatively high speed, and contain a large number of poles. Complex circuitry is necessary for their phase control and modulation in the SCR firings, as at 400 cycles per second. The power inverters hereof are superior to cycloconverters and other static power conversion systems in ruggedness, stability and efficiency.

The static inverters of the present invention provide polyphase alternating current power at a desired frequency from direct current power input. A D.C. rectifier link precedes the inverter where the primary power is an A.C. generator or A.C. power line. Where a battery is the power source, as in a laboratory, or in an industrial truck, such rectifier is not needed. The A.C. power capability of the inverters hereof is determined by the rating of the SCR banks or equivalent, the size of the associated output transformers, and the number of channels thereof. The inverters, say for 400 cycle output, may be readily constructed in the range from 0.5 to 120 kva. With a common base-frequency unit, the outputs of several such inverters may be directly connected in parallel to a common bus. The principles of this invention are applicable in the distance high voltage transmission of direct current power. High capacity current switching tubes, as "Ignitrons" in place of the SCR's, could convert such D.C. power for commercial A.C. lines, as at 60 cycles per second.

The above and other features, objects and advantages of the present invention will become more apparent from the following description of exemplary embodiments thereof illustrated in the accompanying drawings, in which:

FIG. 3 is a diagrammatic representation of a three-phase summing transformer of the power inverter of FIG. 2.

FIG. 4 illustrates the square waveform voltage inputs to the primary windings of the summing transformer of FIG. 3.

FIGS. 5 and 6 illustrate the waveform of the respective output signals at the secondary windings of the summing transformer of FIG. 3 having input signals per FIG. 4.

FIG. 7 illustrates in sections A through D the waveform construction from stepped signals to the sinusoidal output in the two-channel inverter hereof.

FIG. 18 illustrates in sections A through F the summing transformers and their corresponding waveform components for a six-channel inverter of this invention.

FIG. 19 illustrates the waveform construction, formed of the signal components of FIG. 18, producing a stepped output signal of the six-channel inverter.

FIG. 20 is a circuit connection diagram of the summing transformers of the six-channel inverter, for producing the output signal of FIG. 19.

Figure 1:
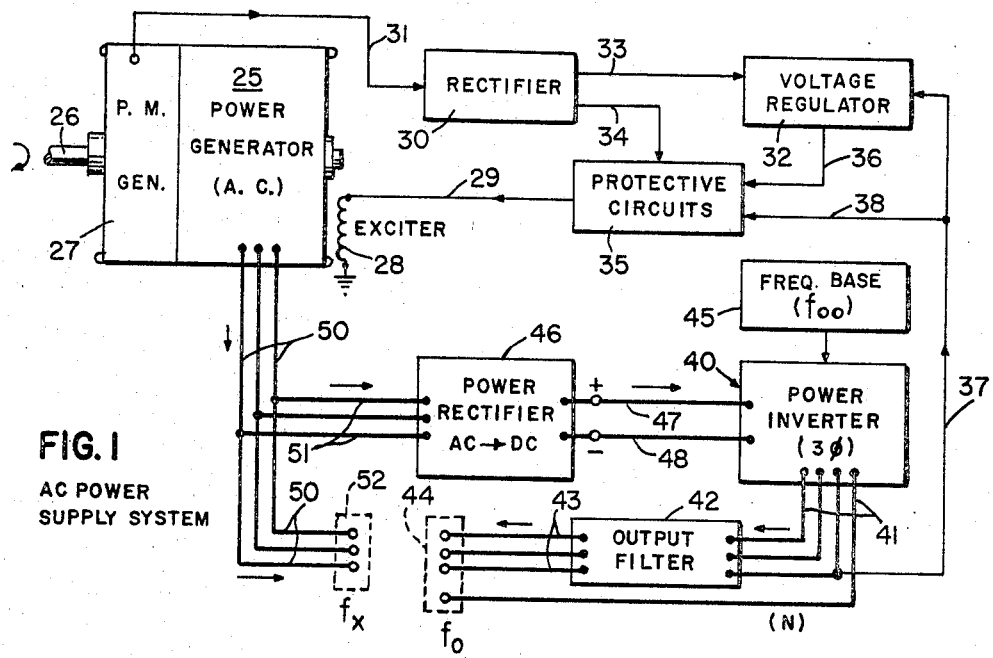
FIG. 1 is a block diagram of an exemplary alternating current power supply system, for use aboard an airplane.

FIG. 1 is a diagram of an application of the A.C. power inverter of the present invention for use aboard an aircraft; suitable for commercial, military or private use. Each engine (not shown) is mechanically coupled to the drive shaft 26 of the power generator 25 for an individual inverter power supply section. A permanent magnet generator 27 is incorporated in main generator 25, primarily to supply its exciter winding 28. A steady D.C. voltage level is effected through solid state rectifier 30 energized by the P.M. generator 27 via lead 31, and by a voltage regulator 32. Regulator 32 connects with rectifier 30 by lead 33. A fault responsive protective circuit 35 is coupled to voltage regulator 32 by lead 36, to the rectifier 30 by lead 34, and to the system A.C. output (41) via leads 37, 38. The exciter 28 is thus energized, through connection 29, in a manner to reasonably maintain the rated A.C. voltage output of generator 25, despite its variable driven speed.

Power inverter 40 has a three-phase alternating current output of precise predetermined frequency ($f_o$). A typical output frequency for $f_o$ is the standard 400 cycles per second, for the operation of instruments, gyroscopes and electronic apparatus aboard the airplane. The four-wire three-phase output 41 of inverter 40 contains a neutral lead (N). An output filter 42 of practical size provides good sinusoidal waveform for the three-phase output to terminal board 44, at the frequency $f_o$, through three-phase A.C. lines 43 with neutral lead (N). Negligible harmonic content appears at the $f_o$ output. Hence minimum electromagnetic shielding of the $f_o$ power feeder bus or cables is required. This affords considerable savings in cost and weight. Inverter 40 is supplied by direct current from a power rectifier 46, through leads 47, 48. A base-frequency unit 45 feeds inverter 40 at a fixed impulse rate ($f_{oo}$) to control the triggering action of the inverter to insure its predetermined output frequency ($f_o$), in a manner to be described hereinafter.

Generator 25 is preferably a polyphase alternating current type, being reliable and efficient in power generation and weight factor. Its output frequency ($f_x$) is proportional to its rotational speed, which in turn depends on that of the engine driving it. Jet engine pad speeds, for example, may vary from 3300 to 6500 r.p.m. during flight. The exemplary generator (25) has a three-wire three-phase output line 50 to which D.C. rectifier 46 is connected by cable 51. Power rectifier 46 is conventionally designed to handle the type of power input thereto, and to convert it to direct current at the requisite rated voltage and current capacity. The exemplary rectifier (46) provides a voltage, across its output terminals at leads 47, 48 of 285 volts D.C., preferably held ungrounded or "floating" for better reliability. For the same reason electronic units 40, 42, 45 are ungrounded; but may be grounded if desired.

The output lines 50 of main generator 25 extend to a terminal block 52 as a source of A.C. power at varying or "wild" frequency ($f_x$). As mentioned hereinabove, power at variable frequency ($f_x$) is useful for many electrical functions aboard an airplane. Typically, the direct output frequency ($f_x$) varies over a 2:1 range. Such wild frequency power ($f_x$) is practical for deicing, heating, lighting, and other uses. The capacity of the directly generated power ($f_x$) used aboard can be predetermined, as 20% or even 50% of the respective ratings of the generators. The balance of the generated capacity is used to power the rectifiers (46) for the power inverters (40).

The power supply system of FIG. 1 thus lends itself to effective and efficient overall power management for particular aircraft installations. One inverter (40) is used for each engine and associated alternator (25). The inverter outputs are connected together to provide the constant frequency power requirement ($f_o$). The general power requirement ($f_x$) is obtained directly from the generators as aforesaid. Use of a common base-frequency unit (45) for the several power inverters (40) produces outputs that may be in phase and at the same frequency ($f_o$). The inverters are connected in electrical parallel, to a common (400 cycles per second) feeder bus or cable. A temperature controlled tuning fork or crystal oscillator in the base-frequency unit (45) readily maintains the output frequency $f_o$ within a small fraction of one percent to provide beneficial operating results aboard. The exemplary A.C. voltage output at $f_o$ terminal block 44 is: 115 volts line-to-neutral; 200 volts line-to-line, with excellent voltage regulation. Typical power ratings of the inverters are 30, 40 and 60 kva.

Figure 2:
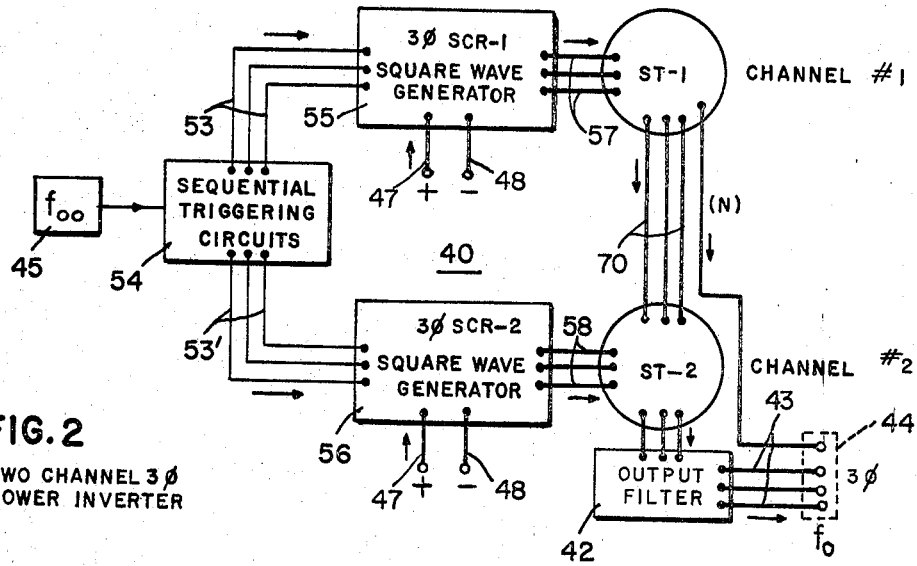
FIG. 2 is a schematic diagram of a two-channel three-phase power inverter in accordance with this invention.

FIG. 2 is a schematic diagram of a three-phase inverter (40) hereof, arranged in two channels. Channel No. 1 comprises square wave generator 55 that feeds into an associated output or summing transformer ST–1. Channel No. 2 comprises square wave generator 56 that feeds into its transformer ST–2. Both square wave generators 55, 56, are solid-state three-phase devices. They incorporate respective banks of silicon controlled rectifiers arranged to provide properly timed and phased voltages of sizeable magnitude to transformers ST–1 and ST–2. Operation of the SCR banks is effected by sequential triggering circuits 54, which in turn are controlled by base-frequency impulses ($f_{oo}$) from unit 45. The triggering unit 54 is shown connected by cables 53, 53' to the generators 55, 56. Exemplary circuits for units 54, 55 and 56 are shown and described in connection with FIGS. 8 to 13.

The square wave generators (55, 56) are powered by the direct current output lines (47, 48) from the power rectifier (46). Their three-phase square wave currents are respectively applied to the primary windings: of transformer ST–1 via leads 57; and of transformer ST–2 via leads 58. The transformers ST–1 and ST–2 are of three-phase configuration, and of stationary laminated iron construction. The secondary windings of output transformers ST–1 and ST–2 are interconnected, in series, providing optimum stepped waveforms of basic fixed-frequency ($f_o$). Such connection is indicated by multi-wire cable 70 between transformers ST–1 and ST–2; with an optional fourth-wire neutral (N).

The summing transformers hereof (as ST–1, ST–2), their principles of construction and electrical interrelation with each other and with the signals and circuits of the inverters, are significant and important to the excellent effectiveness, flexibility, and efficiency of the present invention. FIGS. 2–17 relate to an exemplary two-channel three-phase inverter system; FIGS. 19–20, to a six-channel system. The power inverters, in their more general aspects, may contain any practical number of channels, as multi-channel inverters. Also, the number of electrical phases thereof is optional: as one-, two-, three- or six-phase output. The polyphase multi-channel inverter embodiments provide improved efficiency and higher power ratings.

Figure 15:
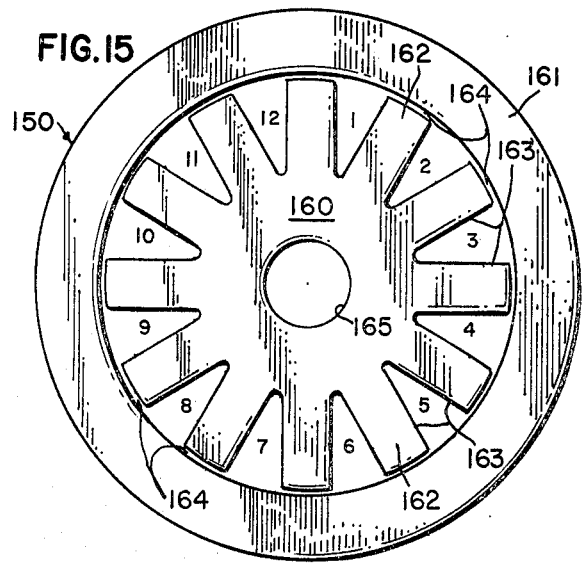
FIG. 15 is a plan view of the lamination assembly of an exemplary summing transformer.

FIG. 3 is a circuit representation of the base or reference summing transformer ST–1 of channel No. 1 (see FIG. 2). It has a laminated iron core 61, 61, within a preferably donut annular shaped laminated enclosure, as shown in FIG. 15. Its primary 60 comprises three-phase windings 62, 63, 64 wound in conventional array, as by lap winding described hereinafter in connection with FIG. 16. The secondary 65 comprises three-phase windings 66, 67, 68 wound in space-phase with the respective primary windings 62, 63, 64. The transformer primary and secondary 60, 65 thus comprises three phases: $\phi_1$, $\phi_2$, $\phi_3$. The secondary windings of the summing transformers of each channel, other than for base channel No. 1, are hsifted in space-phase by predetermined amounts with respect to their respective primary windings. Also, importantly as well, the time-phase of the square wave input signals to the respective primary windings are displaced in predetermined amounts. The result of such preset and interrelated space-phase and time-phase displacements yields in summation, output signals of optimum stepped waveform construction referred to. The principles involved therein are explained in detail hereinafter, particularly in connection with FIGS. 7 and 18.

Reference summing transformer ST–1 is shown with both its primary 60 and secondary 65 connected in "wye" configuration; it being understood that "delta" connections may instead be used. The central or common terminal 69 of secondary 65 affords the neutral wire connection (N) for the three-phase four-wire output indicated in FIG. 2 at 44. Cable 70 connects the secondary windings of the summing transformers in series, as shown and explained in connection with FIGS. 7C and 9 for the two-channel version; and in FIGS. 18 and 19, for six-channels. Balanced polyphase output signal summation occurs thereby, producing optimum stepped waveforms of relatively low distortion that are readily filtered.

The square wave power fed by generator 55 to primary 60 of summing transformer ST–1 is graphically illustrated in FIG. 4. Each winding 63, 63, 64 is impressed by a square waveform voltage of alternate positive (+) and negative (—) components, each of 180° duration at the frequency of system output, namely ($f_o$). With winding 62 as reference phase $\phi_1$: winding 63 is phase $\phi_2$, impressed with square wave voltage that lags in time-phase by 120°, as shown; and winding 64 is phase $\phi_3$, impressed with voltage that lags $\phi_1$ by 240°, and $\phi_2$ by 120°. A resultant rotating field is in effect created, as in polyphase transformers and motors; the induction to secondary 65 being on an effective square wave basis, as will now be described.

Apparatus for the generation of three-phase square wave power, per FIG. 4, may embody banks of transistors, silicon controlled rectifiers, or gas-filled tubes. Exemplary SCR circuitry therefor is presented in FIGS. 8 and 11. The invention inverters require plural sets of such polyphase square voltages, each in respective predetermined time-phase displacement, for energizing the corresponding channels thereof. Thus, the two-channel embodiment 40 (per FIG. 2) utilizes polyphase square wave power via cable 58 of generator 56 that is displaced by 30° in time-phase with respect to the three-phase counterpart from generator 55, for reasons to be set forth in connection with FIG. 7. Similarly, the six-channel inverter of FIG. 18 has each of its channels fed with square wave power sets that are successively displaced by 10° in time-phase. Circuits for obtaining the requisite precise timing and triggering to provide the sequential input voltages are described in detail in connection with FIGS. 11 to 13.

FIGS. 5 and 6 illustrate the resultant waveforms of the signals that appear at the secondary (65) output of transformer ST–1 when the aforesaid three-phase square wave voltages are applied to its primary (60) input, see FIGS. 2 and 3. Induced in each secondary winding 66, 67, 68 is a stepped waveform. FIG. 5 illustrates its waveform output, at output line-to-neutral point 69. That across winding 66 (phase $\phi_1$) is in time phase with the $\phi_1$ square wave input (FIG. 4), extending with (+) and (—) swings each 180° long. The secondary phases $\phi_2$ and $\phi_3$ are correspondingly 120° and 240° time-phase displaced, as will now be understood by those skilled in the art. Each step of the FIG. 5 waves is 60° long, and 0.5 in relative magnitude. Each full wave over 360° is thus in eight (8) steps, corresponding to one cycle for the $f_o$ output. The plateau peaks are at the magnitude 1.0.

Such stepped output waveforms result from the voltages induced by the polyphase field induction, which due to the 120° space-phase displaced windings of transformer ST–1 and the three-phase square wave inputs thereto are in effect a rotating field. The corresponding line-to-line waveforms, as across lines $\phi_1$ to $\phi_2$ is shown in FIG. 6; its 0° time reference also being that of phase $\phi_1$ input (FIG. 4). It is noted that this signal output ($\phi_1$ to $\phi_2$) is only of 120° duration for both its (+) and (—) sections, with 60° blanks or zero current therebetween. Further, its relative amplitude is 0.866 compared to the line-to-neutral waveform (FIG. 5).

The waveform of the signal output between lines $\phi_2$ and $\phi_3$ is the same as between lines $\phi_1$ to $\phi_2$, except it lags 120° to coincide with input phase $\phi_2$; and that between lines $\phi_3$ and $\phi_1$, being further behind by 120°.

It is understood that the polyphase square wave input voltages to the polyphase primaries of the summing transformers hereof (ST–1, ST–2) correspond to the idealized waveforms of FIG. 4. Although sharp rise square waveforms are illustrated, the invention system is also effective with input waveforms having rounded corners or with sloped rise and fall shape. Particular means for generating such polyphase square wave currents are optional, in utilizing the invention system. Thus mercury vapor control tubes, as well as solid state devices, are contemplated therefor. The three-phase square wave array shown in FIG. 4 corresponds to E.M.F. measurements from each output line (of cable 57) to a virtual or voltage midpoint of the generator (55), or to the opposite link during conduction, as is understood by those skilled in the art. The line-to-line voltage of the generator output (57) is as shown in FIG. 6 for secondary 65, on a three-phase basis however. The magnitude of the secondary voltages depend upon the turns-ratio, primary (60) to secondary (65), as will be set forth. Finally, the corresponding parameters of the polyphase outputs of the other square wave generators in the system, are in time-phase displacement with respect to the base generator (55), as already indicated.

FIGS. 7A to 7D illustrate the principles of the system output waveform construction for two-channel inverters (40). FIG. 7A corresponds to FIGS. 3 and 5, depicting reference summing transformer ST–1 with an applied square wave voltage $E_1$ (three-phase) to its primary windings (60). The line-to-neutral secondary waveshape ($e_1$), for the reference winding at 0° (and on a three-phase basis, with the other windings) is the 8-step waveform of FIG. 5. This waveshape ($e_1$) has a peak magnitude $b$ at unity level 1.0, with its intermediate steps $a$ at the 0.5 level. The secondary windings (65) of transformer ST-1 are in space-phase with its primary windings, in the manner described in connection with FIG. 16 hereinafter.

FIG. 7B shows the operation of the second summing transformer (ST-2) of the two-channel inverter (40). Three-phase transformer ST-2 is similar to transformer ST-1 except that its secondary windings are displaced by 30° in space-phase with respect to its associated primary windings. This construction feature is set forth in connection with FIG. 17 hereinafter. The resultant (+) and (−) waveform ($e'_2$) of the ST-2 secondary windings, line-to-neutral, is the same as that shown in FIG. 6 for line-to-line of the ST-1 secondary windings. The 30° space-phase shift in ST-2 provides such resultant waveform (with 60° alternating blanks), and magnitude of 0.866 for (c), for the (+) and (−) 120° sections, per FIG. 5.

However, in order to synthesize the desired 12-step output waveform of FIG. 7C, the secondary output of ST-2 is shifted to lag 30° in time-phase with respect to the 0° reference, as of the ST-1 output. This is accomplished by impressing the three-phase square wave input (via 58) to transformer ST-2, 30° behind in time-phase with respect to the reference input (at 57) to ST-1. Such arrangement is described in more detail in connection with FIGS. 9 and 10, and is arranged through the sequential triggering circuits per FIGS. 12 and 13. The net result is an output waveform ($e_2$) at the ST-2 secondary windings, shifted to start at the 30° lag point, as shown in FIG. 7B, and in proper three-phase array, as will now be understood by those skilled in the art.

FIG. 7C shows how the respective secondary windings of ST-1 and ST-2 are connected in series to produce the desired stepped output waveform ($e_3$) for the inverter. Each secondary winding of transformer ST-1 is connected in series-add with the corresponding secondary winding of transformer ST-2. Their combined induced voltages ($e_1+e_2$) produce the summation voltage waveform $e_3$, on an instantaneous time basis. The connections are from neutral point $n_1$ of ST-1, to series-add connections of the windings to yield resultant output $e_3$. Similar connections are made for the two other winding sets of three-phase transformers ST-1 and ST-2, as will be understood.

The optimum 12-step waveshape of output signals $e_3$ each extend across 360° in alternate (+) and (−) sections of 180° each. Their peaks at $d$ are at relative magnitude 1.866, combining the $b$ and $c$ levels of signal components $e_1$ and $e_2$. Its peak plateaus each extend for 60°, with its intermediate steps being 30°. This twelve-step waveshape ($e_3$) is synthesized herein in a stable and relatively simple manner in two channels, with two output transformers ST-1, ST-2. Such advantageous 12-step waveform per se is well known in the inverter art. The invention power inverters utilize such 12-step waveforms to good advantage in the two-channel embodiment; and waveforms with a significantly higher number of steps with greater advantage in versions with more channels. For example, FIG. 19 illustrates the 36-step waveform of a six-channel inverter hereof.

The 12-step waveform ($e_3$) is thus established for all three phases $\phi_1$, $\phi_2$, $\phi_3$ of the two-channel inverter (40), each being 120° apart in time-phase. Interconnection of the secondary windings, in three-phase array with line neutral (N), is diagrammed in FIG. 9. Output cable 41 connects to the three-phase filter (42) that removes the harmonic content of the initial stepped waveforms, providing clean polyphase output currents at the system frequency ($f_0$). FIG. 7D illustrates the resultant output in sinusoidal waveform $e_0$, for each phase. The 12-step waveform has no harmonics below the 11th; contains the 11th and 13th harmonic of fundamental $f_0$. In a balanced three-phase system the next harmonics that appear are the 23rd and 25th, second order in magnitude. The latter are inexpensively filtered, for $f_0$ frequencies of 400 cycles per second or higher. Relatively small series resonant filters effectively strip out the 11th and 13th harmonic content. The higher harmonics, and radio frequency interference, are readily removed with small series chokes and parallel capacitors. The filtering unit (42) for the polyphase inverters hereof is significantly less in weight and cost, for a given power output, as compared to those required for other types of inverters or cycloinverters.

Figure 8:
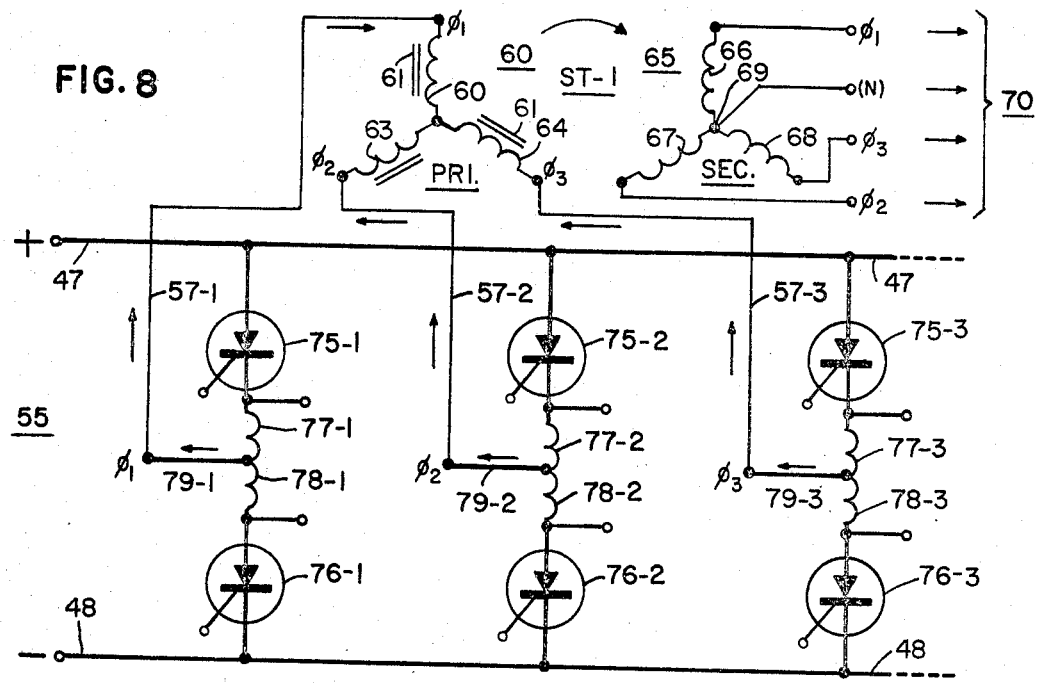
FIG. 8 is a schematic circuit diagram of a silicon controlled rectifier bank that provides the square-wave inputs, per FIG. 4, to the primary windings of a summing transformer.

A silicon controlled rectifier bank supplies the polyphase square wave input currents. A three-phase bridge inverter circuit is utilized for the square wave generators (55, 56) for summing transformers ST-1, ST-2. Such bridge inverters are known in the art, in essential terms. The inverter of generator 55 for ST-1 is schematically shown in FIG. 8. Each phase $\phi_1$, $\phi_2$, $\phi_3$ includes a power SCR pair: 75-1, 76-1; 75-2, 76-2; 75-3, 76-3. A center-tapped air core inductor or choke coil is in series between each SCR pair for the commutation, establishing inductor sections: 77-1, 78-1; 77-2, 78-2; 77-3, 78-3. The power output connection of each SCR pair is taken from the junction of its inductor pair. The respective bridge output leads 79-1, 79-2, 79-3 connect to windings 62, 63, 64 of primary 60 of transformer ST-1, through: lead 57-1 for $\phi_1$; lead 57-2 for $\phi_2$; lead 57-3 for $\phi_3$. Generator 55 is powered by the D.C. cables 47, 48.

The leads extending from the cathode and gate electrodes of the SCR's in FIG. 8 are shown unconnected, for simplification of the diagram. They connect with further components for SCR triggering and commutation in predetermined sequential relation. Exemplary circuitry therefor is shown and described in connection with FIG. 11. Precise positive firing and extinguishing of the SCR's of the square wave generators hereof provide sharp square waveforms with rise times of a few microseconds, and with the requisite polyphase phasing and interchannel timing for optimum operation of the inverters, see FIG. 4.

Figure 9:
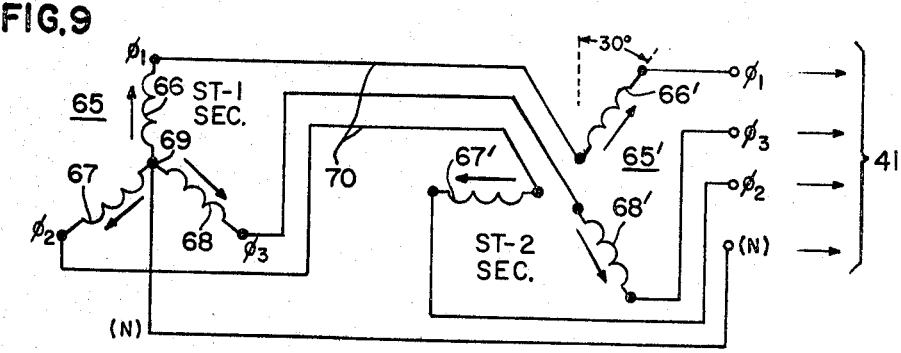
FIG. 9 is a circuit connection diagram of the two sets of secondary windings, to provide three-phase power output in the exemplary two-channel inverter.

The secondaries 65, 65' of the summing transformers (ST-1, ST-2) are connected in series to provide the three-phase 12-step waveform outputs as outlined hereinabove. FIG. 7C illustrates such connection for one phase; FIG. 9, their three-phase interconnection. The respective secondary windings 66, 67, 68 of ST-1 are each in electrical series-add connection with their associated phase windings of transformer ST-2 through three lead cable 70 and common neutral lead (N). Also, series-add relation is indicated by the direction of the arrows at the windings.

An important advantage of such series arrangement of the output windings is that, for a rated output voltage, the voltage from each transformer (ST-1, ST-2) need only be about one-half the final one. This results in less costly SCR's for the generators (55, 56). In effect, the result is current multiplication, for any given output power rating. The use of multi-channels for the inverters hereof is economical for higher power inverter systems. The relative advantages in the use of six channels, is described hereinafter in connection with FIGS. 18 to 20, as are the general principles involved.

Figure 10:
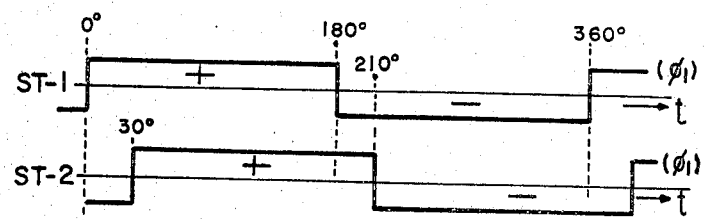
FIG. 10 illustrates the relative time-phase relationship of the square wave inputs to the respective summing transformers of the two-channel inverter.

It is noted that the space-phase relation of the secondary windings 66', 67', 68' of second transformer ST-2 of the two-channel inverter (40) is displaced 30° from the reference (ST-2) primary windings, as hereinabove set forth. Further, as stated, the three-phase square wave input (58) to the primary windings of the ST-2 transformer is 30° behind in time-phase with respect to the corresponding input phases (57) to transformer ST-1. FIG. 10 illustrates such 30° time-phase shift of phase $\phi_1$ currents for the transformers ST-1 and ST-2. Each is a square wave at fundamental frequency ($f_0$), with that for ST-2 shown starting 30° later (lagging) with respect to the 0° reference start for ST-1. The other two phases $\phi_2$, $\phi_3$ of the input to ST-2 are similarly displaced, to provide the requisite three-phase square wave input (58) to transformer ST-2. The sequential triggering circuits (54) described in connection with FIGS. 12, 13, control these time-phase relations for the respective three-phase current generation of SCR units 55, 56.

Figure 11:
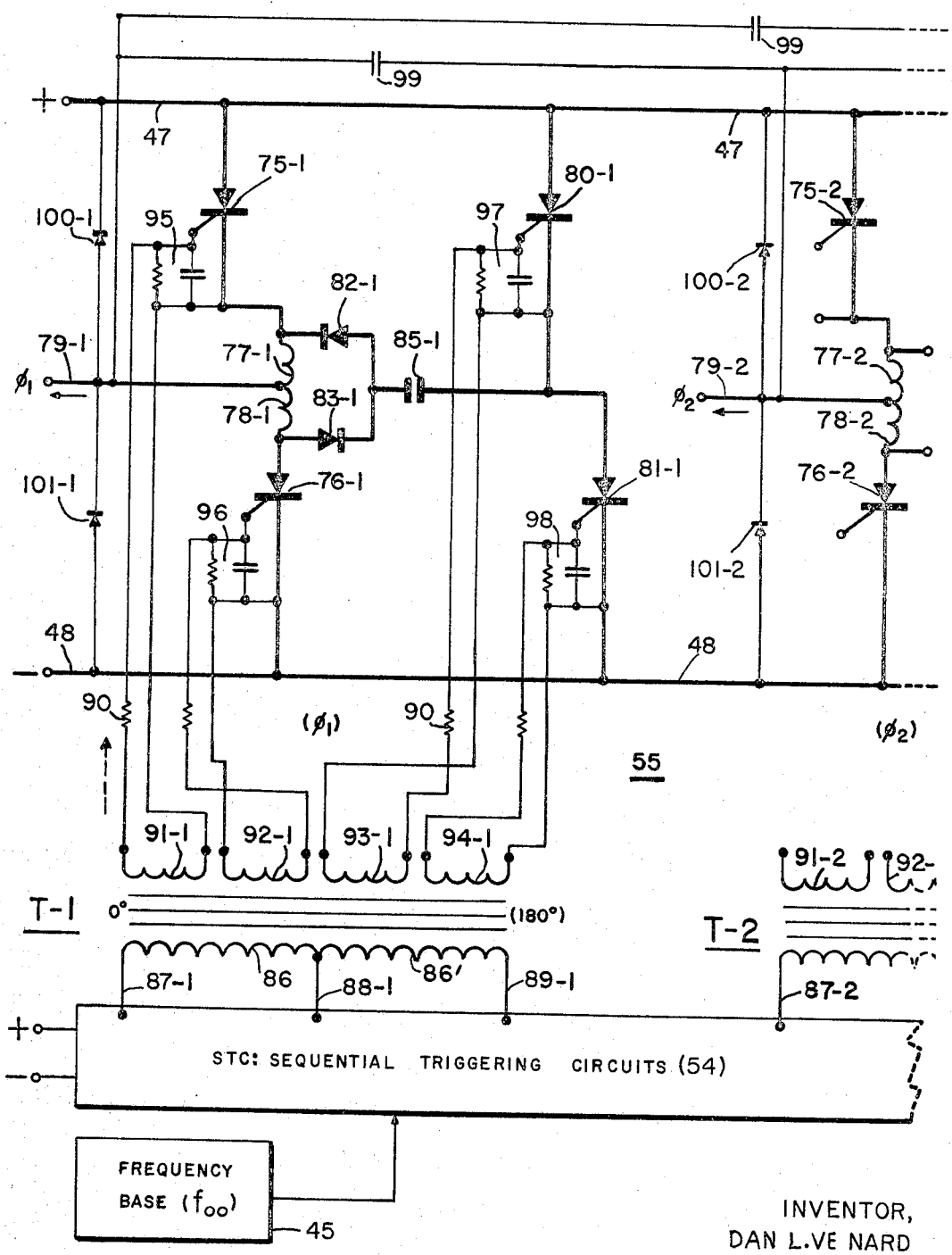
FIG. 11 is a schematic circuit diagram of a typical section of the exemplary square wave signal generator for the two-channel inverter heereof.

FIG. 11 is a schematic circuit diagram of phase $\phi_1$ of three-phase bridge square wave generator 55 for the two-channel inverter (40). The remaining two phases are similar in circuitry and operation, in respective 120° and 240° time-phase displacements. The phase $\phi_1$ section comprises power silicon controlled rectifier pair 75–1, 76–1, and a pair of commutation SCR's 80–1, 81–1. The current rating of the commutation SCR's is about 30% that of the power SCR's. Capacitor 85–1 is used to store electrical energy sufficient for extinguishing SCR 75–1 or 75–2 in commutation action, as will be set forth. Diodes 82–1, 83–1 are steering diodes. In operation, SCR's 75–1 and 81–1 are turned-on together while SCR's 76–1 and 80–1 are turned-off; and vice versa, in succession. Towards this end, the phase or direction of the control signals applied, are in-phase for SCR's 75–1, 81–1 on the one hand, and 180° behind as applied to SCR's 76–1, 80–1.

Gate transformer T–1 contains a center-tapped primary winding, with sections 86, 86' that connect with the sequential triggering circuits (54) through leads 87–1, 88–1, 89–1. Four independent secondary gate control windings 91–1, 92–1, 93–1, 94–1 are used for the SCR control circuitry. Secondaries 91–1 and 94–1 connect to the respective gates of related SCR's 75–1, 81–1; secondaries 92–1, 93–1 to those of SCR's 76–1, 80–1. The connections of the latter secondary winding pair is relatively reversed with respect to the former. Thus, the left terminals of gate control windings 91–1 and 94–1 connect to the gates of SCR's 75–1 and 81–1; while the right terminals of windings 92–1, 93–1, to those of SCR's 76–1 and 80–1. A protective current limiting resistance (90) is preferably used in series with each such gate lead. The secondary gate control windings also connect to the respective cathodes of the four SCR's. Resistance-capacitor networks 95 to 98 are connected between the respective SCR gates and cathodes, and capacitors (99) are connected between the phases as shown, for stability and the suppression of spurious frequencies.

Operation of the phase $\phi_1$ square wave current generation is as follows: When the gate terminals of gate control windings 91–1 and 94–1 are in their positive cycle, power SCR 75–1 and commutation SCR 81–1 are activated and turned-on. Current thereupon flows from positive bus 47 through SCR 75–1 and inductor 77–1, to the $\phi_1$ output line 79–1: to coil 61 of summing transformer ST–1 via lead 57–1 (see FIG. 8). Opposite power SCR 76–1 is off during this period, wherein no current flows through it to negative bus 48. However, current concurrently flows through commutation SCR 81–1, resulting in the charging-up of capacitor 85–1 substantially to bus voltage between lines 47 and 48, its plates on the left side becoming positive. When capacitor 85–1 is so charged current flow ceases through SCR 81–1, and it turns-off as a self-commutation action. Positive current from bus 47 flows through SCR 75–1 to output line 79–1 for fully 180°, as the $\phi_1$ signal in square waveform, (see FIG. 4), whereupon this SCR is turned-off.

Reversal of polarity of the $\phi_1$ output current of line 79–1 is accomplished by the rapid turn-off of SCR 75–1 and turn-on of its paired power SCR 76–1 in precise timed relation. This SCR timing is effected at the successive 180° and 360° points in the $f_o$ cycling, by the triggering circuits (54) to be described. The alternate primary-half 86' of transformer T–1 becomes energized, and the primary-half 86 deenergized. The phase of the control signals through the control secondaries are thereby reversed. The gate signals to SCR's 75–1 and 81–1 become phased negative, and the gates of SCR's 76–1 and 80–1, directly positive. Firing of power SCR 76–1 occurs, and the direction of current through $\phi_1$ line 79–1 reverses, flowing through inductor section 78–1 and the now turned-on SCR 76–1, to negative bus 48. The duration of this reversed flow is for 180°, providing the negative (−) square wave output half of phase $\phi_1$; whereupon the $f_o$ cycle is repeated as herein described.

It is important to turn-off the conduction of power SCR 75–1 at the end of its 180° period, as promptly as possible, and to rapidly successively fire its opposite power SCR 76–1; and vice versa. The exemplary commutation circuitry accomplishes this function, providing square waves with sharp rise times. As stated, at the end of the positive (+) half-cycle, the gates of SCR's 75–1 and 81–1 are turned-off, and their opposite SCR's 76–1, 80–1 turned-on, i.e. in turn rendered positive. The latter SCR's thereupon start to conduct. Capacitor 85–1 has in the positive half-cycle become charged to substantially the voltage between D.C. lines 47, 48, with its left plates positive. Upon the conduction of commutation SCR 80–1, about twice the bus voltage is thus presented to the cathode of power SCR 75–1. This directly back-biases SCR 75–1 to extinguish it, as will be understood by those skilled in the art.

The commutation function of capacitor 85–1 then is reversed. Its right-side plates thereupon become positive at bus 47 potential, through conducting SCR 80–1. When capacitor 85–1 is then charged-up current through SCR 80–1 ceases, and it turns-off. At the 360° point of the $\phi_1$ cycle, the positive control signals to the gates of SCR's 76–1, 80–1 are removed, and SCR's 75–1, 81–1 are directly turned-on. Conduction of SCR 81–1 connects the charged capacitor 85–1 to negative bus 48, and whereupon power SCR 76–1 is back-biased to extinction. This commutation cycle repeats for each 360° square wave generation of phase $\phi_1$, at frequency $f_o$.

The commutation back-biasing period for the power SCR's is arranged to safely effect their turn-off. Towards this end, capacitor 85–1 is related to the inductor sections 77–1, 78–1 on a time-constant basis, to insure that the back-biasing duration is larger than the minimum period necessary to extinguish the particular power SCR's circuits used. For example, an inverter (40) hereof, rated at 10 kva., may use power SCR's rated at 110 amperes-700 volts, (G.E. type C152); commutation SCR's, at 35 amperes-600 volts (G.E. type 2N689; capacitor (85–1), at 5 microfarads-600 volts; steering diodes (82–1, 83–1), at 25 amperes-600 volts (G.E. type IN1197); inductor sections (77–1, 78–1), at 70 microhenries each, 280 microhenries end-to-end; and SCR shunt diodes 100–1, 101–1, type IN1197. The 15 microsecond turn-off period for such power SCR circuits, as a practical minimum, is safely met by the enumerated L-C components (77–1, 78–1, 85–1) which back-bias for periods of 30 microseconds.

Shunt diodes 100–1, 101–1 are respectively connected across the power SCR's: diode 100–1, between bus 47 and line 79–1, for SCR 75–1; diode 101–1, between bus 48 and line 79–1, for SCR 76–1. Diodes 100–1, 101–1 provide return paths for the discharge of capacitor 85–1 in its commutation actions: (a) through steering diode 82–1, coil 77–1, and diode 100–1 to bus 47, when back-biasing SCR 75–1; and (b) through diode 101–1, coil 78–1 and steering diode 83–1, when extinguishing SCR 76–1. Further, shunt diodes 100–1, 101–1 provide return paths for reactive currents that may arise during operation of the power SCR's under inductive load conditions. Other commutation circuitry may instead be used, as will be understood by those skilled in the art.

Figure 12:
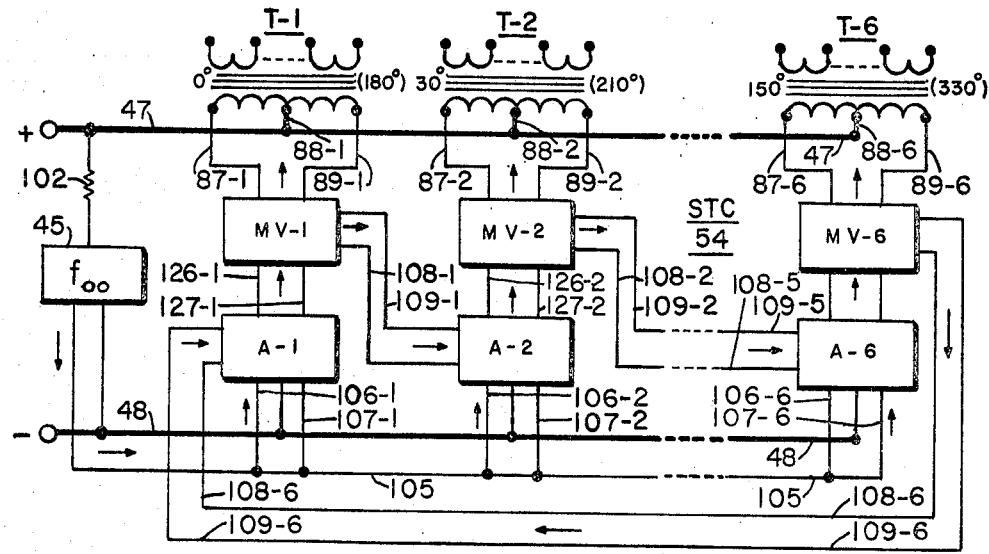
FIG. 12 is a block diagram of the sequential triggering system that controls the silicon controlled rectifier banks per FIG. 11.

FIG. 12 is a schematic block diagram of the sequential triggering circuits 54 (STC) for the two-channel inverter 40 hereof. It comprises six sections, with respective control transformers T–1 to T–6, to impart drive signals for the gates of SCR square wave generators 55 and 56. Each phase of each such generator contains a bridge SCR pair that is gate-controlled from an individual control transformer, each having several secondary windings (91 to 94). Three such control transformers thus supply the drive signals for a three-phase generator, in proper time-phase relation. As explained hereinabove in connection with FIGS. 7B and 10, the three-phase square wave currents of generator 56 that are applied to the second summing transformer (ST–2) lag 30° in time-phase with respect to those from generator 55 to transformer ST–1.

Using the positive half-wave starts of phase $\phi_1$ of generator 55 as reference, the time-phases of its respective generated phases $\phi_1$, $\phi_2$, $\phi_3$ are: 0°, 120°, 240°; and 30°, 150°, 270° for generator 56. A square wave changeover occurs at each successive 30° (in time) when negative square wave halves are also considered. Six successive 30° clock-pulses hereof occur at, say 0°, 30°, 60°, 90°, 120°, 150°. Four of these coincide with positive square wave starts, namely: at 0 and 30° for the $\phi_1$ pair; 120° and 150° for the $\phi_2$ pair. Reversing the secondary winding connections for said 60° and 90° pulses so that the "negative" going SCR's would be triggered thereby, activates the negative side SCR for the $\phi_3$ phase of generator 55 at (60°), and of generator 56 at (90°), both in proper time sequence. Such connection of the control windings of the corresponding transformers (T–3 and T–4) for their phase $\phi_3$ SCR's (not shown) effects this result. Their respective 240° and 270° positive half square waves then occur in proper time-phase (180° later), to complete the three-phase square wave current sets. The following six 30° trigger pulses effect the generation of the second 180° half wave sections (180° to 360°) of the abovesaid respective six square waves, completing the two sets of three-phase currents, with 30° separation. Triggering in this manner, at the 30° rate, utilizes twelve (12) clock-pulses for each 360° output cycle at the basic $f_o$ frequency, on a continuous generation basis.

The six drive transformers T–1 to T–6 are each thus impressed with square waves, to in turn provide the said square wave control currents for the SCR generators 55, 56. Individual multivibrators indicated in block form at MV–1 to MV–6 initiate the square waves in these transformers. Primary winding leads 87–1 to 87–6, and 89–1 to 89–6, respectively connect with these multivibrator units. The primary center-taps 88–1 to 88–6 each connect to positive bus 47. The primary transformer halves are alternately energized, inducing square wave control signals at the $f_o$ cyclic rate into their respective secondary windings 91–1 to 94–1, etc. The multivibrators MV–1 to MV–6 are controlled in timed succession by ring counter circuitry including AND circuits A–1 to A–6 and an electronic base-frequency clock 45. Unit MV–1 is triggered in sequence when its AND unit A–1 has been biased or "set-up" by the change-over activation or triggering of the preceding section (MV–6) via leads 108–6, 109–6 *and* when the succeeding pulse reaches it from clock 45 along clock-line 105 and leads 106–1, 107–1. Such concurrence is conducted through lead 126–1 or 127–1 to flip multivibrator MV–1 into its opposite phase. The polarity of the control currents through the primary and secondaries 91–1 to 94–1 of transformer T–1 are thereupon reversed. Also, in turn, such change-over activation of multivibrator MV–1 directly sends a bias "set-up" signal to the next AND unit (A–2) via leads 108–1, 109–1. Exemplary circuitry for the MV–1 and A–1 units is shown and described in connection with FIG. 13.

The flipped MV–1 unit remains in such state for 180° duration, whereupon it is flopped back to its previous state. Alternate positive (+) and negative (−) square wave halves are thus generated in the windings of transformer T–1 at the $f_o$ cyclic rate. The flip-flop activations of the multivibrators are each at six pulse durations apart. The first of said pulses flipped multivibrator MV–1, which directly "set-up" AND unit A–2, as stated, through leads 108–1, 109–1. The next pulse occurs 30° later along clock-line 105, reaching already "set-up" AND unit A–2 via leads 106–2, 107–2 to concur and directly flip and effect the switch-over of multivibrator MV–2 to its opposite state via leads 126–2, 127–2. The six multivibrators are in this manner flipped in succession: MV–1 to MV–6.

The next (seventh) pulse from clock 45 is 180° later than the first one that flipped the MV–1 unit, and impinges on its AND unit (A–1) that already has been "set-up" by the MV–6 unit. This then directly flops-back unit MV–1 to its said initial setting, as at the start hereinabove, reversing the phase of its output. The precisely timed changeover actuations of the multivibrators continue in sequence, being flopped back in cyclic repetition. The "flips" phases herein produced the first 180° part of said square waves; the "flop-back" phases, the second 180° part, completing each 360° cycle, in succession. This thus establishes the stated six (6) square wave currents as two three-phase sets in 30° time-phase separation. When unit MV–2 is flopped-back 30° later than MV–1 as aforesaid, it transmits in turn a "set-up" signal to the A–3 AND unit of MV–3 (not shown) through leads 108–2, 109–2. The next clock pulse along line 105 reaches AND unit A–3 to initiate phase reversal in MV–3; and similarly in pulsed succession for MV–4, MV–5 and MV–6. The sixth AND unit A–6 is "set-up" through leads 108–5, 109–5 when the fifth MV–5 unit is changed-over.

The flip-flop operations of the six multivibrators MV–1 to MV–6 successively change the polarity of the square wave current halves fed into their associated transformers T–1 to T–6. Noting transformer T–1 as reference, we have the 0° and the "negative" (180°) phase starts thereat. These refer to the relative time-phase of the alternate half-cycles generated in T–1 by MV–1 for the phase $\phi_1$ SCR bridge pair of generator 55 (FIG. 11). The relative time-phase of the square wave control signals from transformer T–2 thus are 30° and (210°), as noted; multivibrator MV–2 being actuated one clock pulse behind MV–1. The succeeeding outputs (not shown) occur at: (60°) and 240° for T–3; (90°) and 270° for T–4; 120° and (300°) for T–5; and 150° and (330°) for T–6. Their output and utilization by the two three-phase SCR bridge generators 55, 56 are as described hereinabove.

Figure 13:
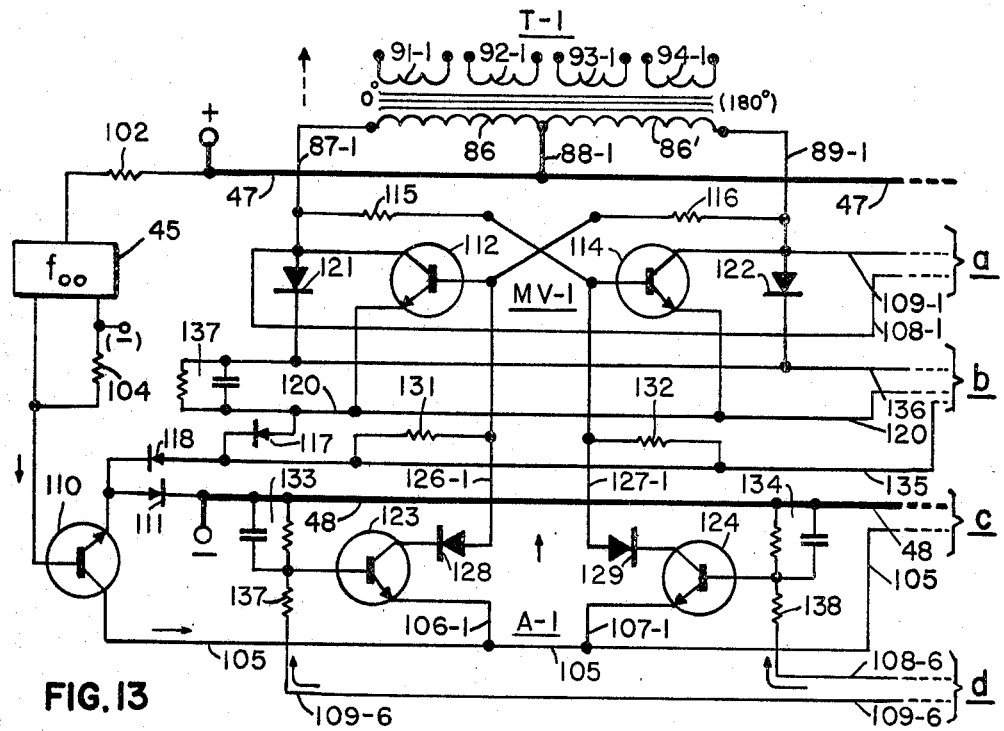
FIG. 13 is a schematic circuit diagram of a typical section of the sequential triggering system of FIG. 12.

FIG. 13 is a schematic circuit diagram of the initial section of the sequential triggering circuits (54) of FIG. 12: including reference multivibrator MV–1, AND unit A–1, and clock pulse generator 45. The frequency $f_{oo}$ of the clock pulses is twelve (12) times that of the output current frequency ($f_o$); namely at 4800 pulses per second for a 400 cycle output. Base-frequency unit 45 may be an electronic oscillator constructed with a unijunction transistor, a tuning fork, a temperature-controlled crystal, a resonant R/C circuit, or the like. The precision and stability of clock unit 45 essentially determines the accuracy of the phasing and frequency of the system output. Unit 45 is energized from the D.C. bus through dropping resistance 102. Its pulses are impressed across resistor 104 to the base of transistor 110, which in turn provides negative going pulses at the $f_{oo}$ rate to clock-line 105. The emitter of transistor 110 connects to the negative bus (48) through diode 111; its collector to common clock-line 105.

The exemplary multivibrators are of the astable type, each comprising a pair of transistor amplifiers magnetically coupled across the associated control transformer. Transistor pair 112, 114 of multivibrator MV–1 has its respective collectors connect to the primary winding 86, 86' of transformer T–1 by leads 87–1, 89–1. Their bases are cross-connected to the winding in positive feedback through coupling resistors 115, 116. Their emitter electrodes connect to common line 120, that extends to negative bus 48 through diodes 117, 118 and 111. Diodes 121 and 122 respectively connect the collectors of these transistors to a common line 136; and in turn to emitter line 120 through resistance-condenser network 137. Each multivibrator hereof would free-run or oscillate at a frequency determined by the volt-second capability of its associated transformer, but is synchronized at the $f_o$ cyclic rate by the clock pulses ($f_{oo}$). Flip-flop synchronization of each multivibrator is accomplished by insuring that the frequency of such change-over activation, namely at $f_o$ is greater than its inherent frequency, as is understood by those skilled in the art.

The multivibrator transistors 112, 114 alternate in their flip-flop activations under the control of the AND transistor pair 123, 124 of unit A-1. The base electrodes of MV transistors 112, 114 connect to the collectors of AND transistors 123, 124 through coupling diodes 128, 129 and leads 126-1, 127-1. These MV bases also connect to system line 135 through resistors 131, 132, and in turn to negative bus 48 through diodes 111, 118. The emitters of AND transistors 123, 124 connect to clock-line 105 upon which the negative going pulses are impressed by transistor 110. The base electrodes of AND transistors 123, 124 are coupled to negative bus 48 through capacitor shunted resistors 133, 134 respectively; and in turn through coupling resistors 137, 138 to the biasing or "set-up" leads from the preceding multivibrator (MV-6 in this case), namely leads 108-6, 109-6.

Set-up lead 108-6 extends from the "opposite" side transistor of the end multivibrator MV-6, namely that which corresponds to the 150° output signal phase, as noted at the left side of transformer T-6 in FIG. 12. Lead 109-6 extends from the transistor at the right-side of MV-6, corresponding to the (330°) output signal phase. To establish the requisite sequence of operation hereof, the "set-up" by multivibrator MV-6 on MV-1 reverses, wherein lead 108-6 from 150° phase connects AND transistor 124 for the (180°) phase of MV-1; and lead 109-6 of (330°), to the AND transistor 123 for the next 0° phase, in the recycling. The "set-up" interconnections between the other sections are symmetrical, namely: the collectors of the MV-1 transistors 112, 114 couple respectively to the AND transistors of the next section (A-2) through "set-up" leads 108-1, 109-1 in left-to-left and right-to-right relation; as are those from MV-2 to A-3, MV-3 to A-4, etc. Thus, turn-off of left MV-1 transistor 112 in its initiation of the 0° phase, will "set-up" the left AND transistor of A-2 for the next 30° phase. Correspondingly, right-side transistor 114 of MV-1 when at the (180°) phase will "set-up" the right-side AND transistor of A-2 in readiness for its (210°) actuation at the next clock pulse. Such section-to-section interconnection starting with MV-6 to A-1, MV-1 to A-2, and so on through MV-5 to A-6 and MV-6 and back to A-1, provides an effective ring counter, controlling the output sequence of the currents from transformers T-1 to T-6 for sequential control of the generators 55, 56.

The ring counter principle hereof flip-flops each multivibrator once for every six clock-pulses. The 0° phase "start" commences at the left side of A-1, MV-1 and T-1; being activated 30° after the start of the (330°) phase at the right-side of A-6, MV-6 and T-6. When the multivibrator transistor at the (300°) side of MV-6 is turned-off, an increased positive signal is conducted by "set-up" lead 109-6 to the base of the 0° phase transistor 123 through coupling resistor 137. This "set-up" signal is maintained for 180° of the $f_o$ cycle. However, the next negative-going clock pulse reaches the emitter of transistor 123, whereupon the base electrode of MV-1 transistor 112 is dragged negative with respect to its emitter and is directly turned-off.

In the multivibrator system hereof, when transistor 112 is turned-on it conducts current through half-winding 86 of transformer T-1 in the direction to provide the (180°) control currents in the secondary windings 91-1 to 94-1, while transistor 114 remain turned-off. Thus, the right-side transistor (114) of the multivibrator is off while the indicated control current phase (180°) is in effect. Upon turn-off of left MV transistor 112 by left AND transistor 123 as aforesaid, the right-side multivibrator transistor (114) directly turns-on through the intercoupling. Current thereupon flows from centertap 88-1 through half-winding 86' to produce the opposite square wave signal in the secondaries 91-1 to 94-1, herein at the cycle starting 0° phase. An increased voltage then occurs in "set-up" lead 108-1 that connects from the off transistor 112, to the left AND transistor of the next unit (A-2). The following clock pulse results in a concurrence in A-2, and the turn-off of the left transistor of MV-2; with transformer T-2 output being switched-over from its (210°) phase to the 30° phase output, as will now be understood by those skilled in the art. This process proceeds impulse-by-impulse by clock-line 105, to provide the two sets of three-phase output signals, 30° apart.

The composition of the remainder of the sequential triggering circuits (54) will now be apparent to those skilled in the art. Reference is made to the follow-through leads at the right side of FIG. 13. Positive bus 47 is common to all six sections, connecting to the center-taps of the remaining control transformers, as shown in FIG. 12. Set-up lead pair $a$ (108-1, 109-1) connect to the following AND unit A-2. Lead set $b$ comprises the three common lines 120, 135, 136 for all the multivibrator transistors. Lead set $c$ comprises negative bus 48, and clock-line 105. Return "set-up" leads 108-6, 109-6 from MV-6 to A-1 are at $d$. Clock transistor 110, diodes 111, 117, 118, and R-C unit 137 are common for the STC system 54. It of course is understood that other equivalent means and/or circuitry may be used to accomplish the sequential triggering function of unit 54.

Summing transformer construction

Figure 14:
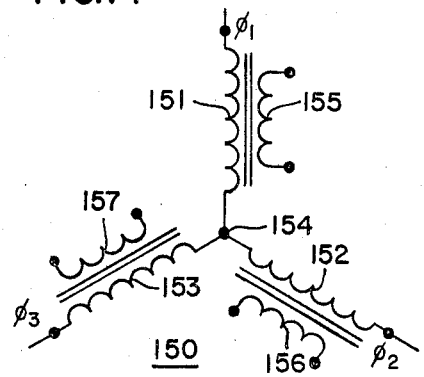
FIG. 14 is schematic diagram of a reference summing transformer.

FIG. 14 is a schematic diagram of a typical summing transformer (150) for a three-phase inverter system hereof. It is iron-cored for efficient magnetic action. The primary windings 151, 152, 153 correspond to the three indicated phases $\phi_1$, $\phi_2$, $\phi_3$, and are "wye" connected at "finish" terminal 154. Summing transformer 150 corresponds to transformer ST-1 described hereinabove, with primary section 60 and secondary 65; see FIGS. 3, 7A, 8. The secondary windings 155, 156, 157 are closely coupled to their respective primary windings 151, 152, 153, as will be set forth. For the reference summing transformer (ST-1) these secondary windings are wound in space-phase with their primary counterpart windings. However, the secondary windings are displaced in space-phase with respect to the wound positions of the primary windings, in the other transformers.

As described hereinabove, the secondary windings (65') for transformer ST-2 of a two-channel inverter (40) are displaced in space-phase by 30° from their primary windings, see FIGS. 7B and 9. In practice, such 30° displacement may be in the plus (+) or minus (−) direction, i.e. apart clockwise or counter-clockwise in its space-phase relation. The resultant square waves are 120° in extent, at 0.866 relative magnitude and with 60° alternate blanks, as induced in each secondary winding. Such resultant secondary coil voltages are the same as appear on a line-to-line basis of the reference transformer (ST-1) with its secondary coils in "wye" connection, as shown in FIG. 6. The 30° space-phase displacements of the ST-2 secondary windings (65') produce such square waveforms in the individual coils, and are directly interconnected with the ST-1 secondaries (65) to construct the desired output waveform, as described in connection with FIGS. 7C and 9. Further, as stated above, the time-phase of the three-phase current input to this ST-2 transformer is at 30° lagging with respect to that into reference ST-1, see FIGS. 7B and 10.

The use of an individual "output" or summing transformer for each inverter channel is a very practical arrangement for these reasons: (1) the rated system power output is divided among the output transformers, on a substantially equal-share basis. (2) Further, the rated output voltage is divided among the transformer secondaries, and summed-up as described in more detail hereinafter in connection with FIGS. 18 to 20. (3) Importantly, also, in accordance with the exemplary system of stepped output waveform construction, the individual predetermined space-phased secondary windings are induced with corresponding time-phase displaced signals, for their proper orientation in the signal summations. (4) The individual transformers hereof provide the requisite output circuit flexibility, without significant penalty in weight or cost over a theoretical single output transformer.

The physical construction and/or configuration of the summing transformers (150) may take many forms. An exemplary arrangement is illustrated in FIG. 15 for the laminated structure thereof. Its core 160 has a plurality of radial spokes 162, 162 surrounded by an annular magnetic member 161. The three-phase embodiment hereof contains twelve spokes (162), with corresponding adjacent winding slots at 1 through 12. The core 160 and outer member 161 are respective lamination assemblies of high quality electrical steel, as M–15; super quality steel, for weight reduction in aircraft applications; or in general, good transformer type silicon steel to reduce loss, heating, etc. Lamination thickness is optional, as .006/.004"; or thicker, as to .015". The slotted core-ring (160, 161) transformer (150) hereof is significantly lighter in weight, and more efficient for the purposes herein, than conventional E-I, U-U, shell core or other known static transformer arrangements. The polyphase windings mutually share the core (160) and annular stator (161) in effective magnetic interaction.

Core 160 has a central aperture 165. A preferred design factor for the extent of its hub from aperture 165 radially to the base of the spokes, is 1.91 times the width (W) of spokes (162). This same dimension, $1.91 \times W$, is used, as the radial depth of the annular laminations (161). Other design criteria may of course be used instead. Exemplary dimensions for a summing transformer (150) rated at 7.5 kva. are: core (160) and ring (161) lamination height, 1.75"; spokes (162), 0.4" wide, with substantially uniformly wide parallel sides, for efficient magnetic operation; aperture (165), 0.625" in diameter; the said hub and ring radial extents, 0.76"; diameter of the spoke laminations (160), 4.0"; and outer diameter of ring laminations (161), 5.5".

It is advantageous to have low magnetic leakage. Towards this end, the fit of the wound spoke lamination assembly (160) within the annular lamination assembly (161) is close. A slip fit, with an air gap of .001" or less per side is feasible. A leakage factor of less than 5% is thus practical. Electrical efficiencies for such transformers (150) of over 90% are readily attainable with excellent weight factors. Tight coupling of primary and secondary windings, with low electrical loss, and low magnetic leakage construction, results in excellent output voltage regulation for the system.

In the exemplary summing transformer (150) per FIG. 15, the primary and secondary polyphase windings are wound within the slot regions 1 to 12. It is to be understood however that one of these winding sets could instead be wound along the cylindrical inner surface, of the annular assembly (161), in corresponding slotted regions facing the spoked slotted regions 1 to 12. The transformer 150 is an efficient integrated polyphase electrical-magnetic device, with a primary three-phase input that may be in "wye" or "delta" connection. Their secondary output windings are individual, for system interconnection as aforesaid. Further, the secondary windings hereof are similar in configuration to the primary. For a 115/200 system R.M.S. voltage output (using a 285 volt D.C. bus 47, 48) a step-down turn-ratio of 2:1 primary-to-secondary was utilized. Other voltage ratings are of course feasible at the $f_o$ output terminals (44). Thus, where 285 volts line-to-line A.C. output is desired, said turn-ratio is correspondingly lower. The turn-ratio may be step-up as well, dependent upon SCR rating and output voltage. It is noted again, that in a two-channel inverter (40) each transformer (ST–1, ST–2) contributes about half of the voltage, as well as half of the power output.

Figure 16:
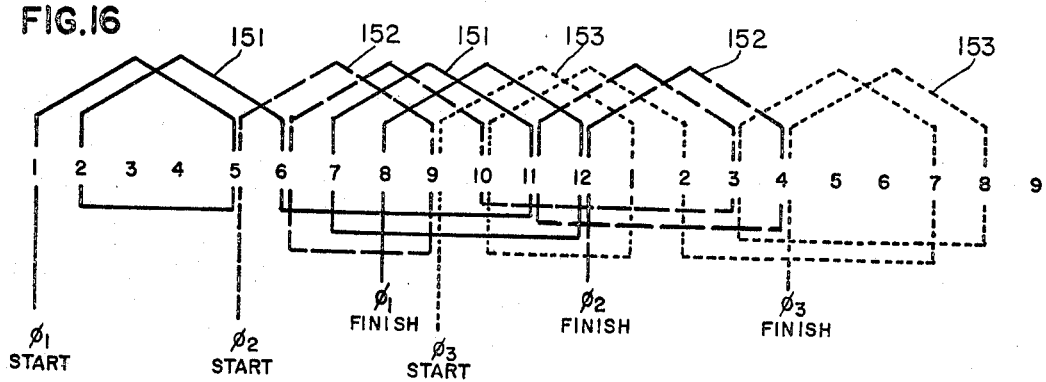
FIGS. 16 and 17 are developed winding diagrams used for describing the construction of the summing transformers of a two-channel inverter system.
Figure 17:
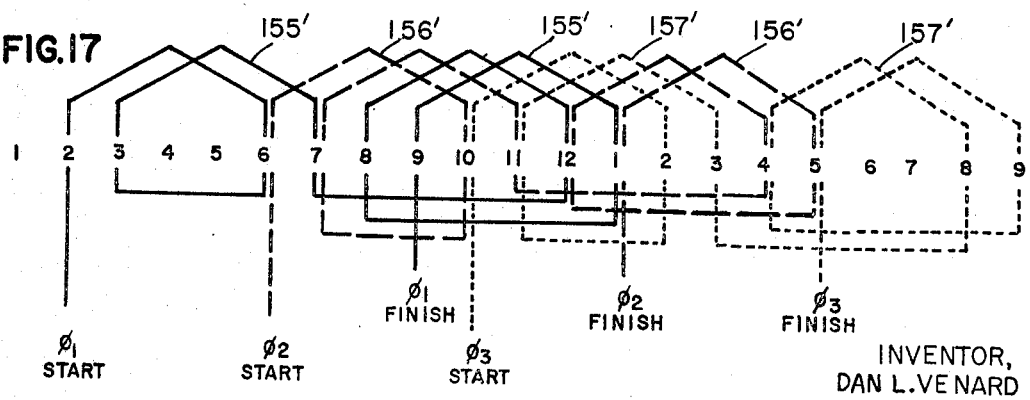

FIGS. 16 and 17 are developed winding diagrams of one version for the transformer windings. The indicated winding type is: two layer lap; in a twelve step configuration, for slots 1 to 12 of the spoked core-ring assembly 161, 162, (see FIG. 15). Other efficient polyphase winding arrangements may be used, as will be understood by those skilled in the motor winding and transformer art. For the exemplary 7.5 kva. transformer (150) the wire size used: No. 12 B & S gauge; about 200 circular mills per ampere. The primary was wound with six (6) turns per coil. FIG. 16 is the winding diagram for the three-phase primary windings 151, 152, 153 of transformer 150. Phase $\phi_1$: starts in slot #1, shifts to slot #5 that is 120° away, then returns to adjacent slot #2 at 30°, and thence to slot #6 that is 30° beyond #5; a 180° shift then occurs to slot #11, back to slot #7 that is 120° from it, thence to adjacent slot #12; ending the $\phi_1$ primary winding at slot #8, with an extending finish lead. Actually the finish leads combine as a common neutral terminal 154 in the "wye" connected embodiment hereof.

The second primary winding 152, as phase $\phi_2$: starts 120° beyond the start of phase $\phi_1$, in slot #5, and is wound in an identical pattern to phase $\phi_1$ except that each slot used is correspondingly 120° apart from its phase $\phi_1$ counterpart, as readily seen in the FIG. 16 diagram. Similarly, the third winding 153, as phase $\phi_3$: starts in slot #9 that is 120° beyond the start of phase $\phi_2$ at slot #5, extends to slot #1 (shown repeated in the developed sequence), and follows the identical phase displaced pattern of the other two phases. It is noted that the phase $\phi_3$ winding is also 120° ahead of phase $\phi_1$, as is required. The secondary windings 155, 156, 157 for the reference transformer (ST–1) are in-phase with their primary counterparts 151, 152, 153, and coincide in winding array therewith. Its phase $\phi_1$ secondary coil (155) starts in the same slot (#1) as that for the primary winding, and follows the same pattern shown in FIG. 16, except for the requisite turn-ratio. The same for secondary coils 156, 157.

The secondary windings 155', 156', 157' for the second channel transformer (ST–2) are each displaced by 30° in space-phase, (in either direction) as aforesaid. FIG. 17 illustrates the relative winding pattern for the secondary windings of a 12-slot transformer having a three-phase reference primary windings. Its secondary (155') phase $\phi_1$: starts in slot #2, that is 30° beyond reference-start slot #1, shifts to slot #6 at 120° away, back to adjacent slot #3, thence to slot #7 30° away from #6; then there is a 180° shift to slot #12, back to adjacent #8, on to slot #1 and back to #9 to finish $\phi_1$. Phase $\phi_1$ secondary winding 155' is thus identical in array to the $\phi_1$ secondary (155) of an ST–1 transformer, except is physically displaced in space by 30°, or by one slot, on a turn-for-turn basis, as required. The phase $\phi_2$ and phase $\phi_3$ secondary windings of ST-2, namely 156', 157', are likewise wound spaced at 30° from their ST-1 counterparts 156, 157, as will now be understood by those skilled in the art.

As set forth, other winding patterns and/or magnetic structure configurations may be used for the output or summing transformers for the multi-channel inverters hereof. Their polyphase windings are magnetically inter-related for efficient transformer action, in step-up, step-down, or unity relation, as required. The exemplary summing transformers, in the spoked core-washer stator arrangement (160, 161), provide composite output waveforms, as the 12-step optimum shape (see FIG. 7C) for the two-channel inverter (40), with a 2.8% R.M.S. harmonic content using only a tuned filter section. Such resultant performance is a considerable improvement over that by competitive static inverters. Higher order channels provide significantly cleaner outputs, as will now be described.

Six-channel inverter

There are a number of practical advantages in using a larger number of channels in the inverter system of the present invention. This is particularly important for higher power output ratings. The output of each channel's transformer is connected in series-add. Thus, the load is substantially equally divided among the output transformers. The voltage output rating is derived by the addition of the individual voltages from each channel transformer. The voltage rating of the silicon controlled rectifiers of the respective square wave generators is correspondingly reduced, practically by a factor of $n$, for an $n$-channel system. More economical SCR's may thus be employed in each channel. The power rating of each of the $n$ output transformers is close to $1/n$ of the requisite rated system output. The effect is current multiplication by channel output increase, as for a given rated voltage output at $f_o$, the higher load rating is accomplished by parallel current utilization in the SCR stages and the sectional output transformers.

Of significant advantage, as well, is a corresponding increase in the number of steps of the output waveforms. This results in less distortion; in outputs that can be filtered to a greater degree, with less expensive and lighter filter units. A two-channel inverter (40) provides 12-step waveforms, see FIG. 7C. A four-channel inverter can be shown to provide 24-step waveforms. A six-channel inverter provides 36-step waveforms per cycle, see FIG. 19. In general, an $n$-channel inverter hereof provides cycle waveforms of $6n$-steps.

The said four-channel system has four output transformers, with secondary windings each successively at 0°, 15°, 30° and 45° in space-phase displacement with their respective primary windings. The time-phase of the polyphase currents impressed on their primary windings are respectively displaced at 0°, 15°, 30° and 45° with respect to the 0° channel as reference (ST–1). The first significant harmonics in the resultant 24-step waveform are the 23rd and the 25th, which are more readily filtered than the 12-step two-channel output. Further, for a given power rating, the respective four summing transformers are each one-half the rating of the two of a two-channel system. Conversely, twice the power rating can be provided where the output transformers are all of the same size. Similarly, for the square wave generators for these two systems.

FIG. 18 depicts the six transformer ST–1 to ST–6, and their corresponding output waveforms, in a three-phase six-channel system. These transformers have similarly oriented primary windings 171 to 176, with respective three-phase inputs thereto $E_1$ to $E_6$, as indicated in sections A to F respectively. Each secondary winding set is respectively space-phase displaced with respect to its primary winding set (171 to 176), in successive increments of 10°, as shown: in-phase, namely at 0°, in reference transformer ST–1; by 10° in ST–2; by 20° in ST–3; by 30° in ST–4; by 40° in ST–5; and by 50° in ST–6. Also, importantly, the time-phase of the respective three-phase inputs $E_1$ to $E_6$ to the transformer primary windings 171 to 176 are made to correspondingly lag in 10° increments. This results in the cyclic output voltages of the secondary coils, $e_1$ through $e_6$, with the respective time-phase lag displacements as shown in idealized shape in FIG. 18.

The $E_1$ to $E_6$ primary polyphase inputs are in square waveform, as described in connection with the two-channel system (40) hereinabove. The stepped respective channel output waveforms of each transformer ST–1 to ST–6 are the result of the composite electrical-magnetic actions therein, due to their respective space-phase winding displacements, and the corresponding lagged time-phase inputs, as stated herein, and as will now be understood by those skilled in the art. It is noted that the output waveforms $e_2$, $e_3$, $e_5$ and $e_6$ extend cyclically beyond 360° when their time-phase is thus shifted. The so extended portions are of lower magnitudes and are indicated in dotted-lines at their initial phase-ins; their effective system presence corresponding thereto.

FIG. 19 illustrates one-phase ($e$) of the summation output waveforms for the six-channel inverter. Each positive (+) 180° half of the cycles ($e$) has 18 steps; as does each negative one (−): a total of 36-steps per cycle, ($e$) at $f_o$ or 400 cycles per second. FIG. 19 is presented as indicative of the six-channel waveform construction through the six respectively added sectional or channel waveforms $e_1$ through $e_6$ of FIG. 18. The light weight construction lines shown within the positive (+) half of stepped waveform ($e$) indicate their complex addition (of $e_1$ to $e_6$) on an instantaneous yet continuous in-time basis, as will be understood by those skilled in the art. FIG. 20 shows the simple series-add interconnection of the corresponding phase of each of the six summing transformers ST–1 to ST–6. Their connection is similar in theory to that described for the two-channel system in connection with FIGS. 7, 9 and 10. The finish lead terminal $n_1$, of the secondary coil for $e_1$ of ST–1 can be the system neutral $n$.

The secondary voltages $e_1$ to $e_6$ are connected to add, through their respective secondary coils as indicated, in the direction of their arrows, from start leads to finish leads $m_2$ through $m_6$, to provide the output $e$ for phase $\phi_1$. The other phases $\phi_2$ and $\phi_3$ are similarly interconnected for the three-phase output, as per FIG. 9 of the two-channel system. More or fewer than the three-phases may be used; broadly, any practical polyphase configuration can be used. Such six-channel inverter system provides a relatively lower distortion waveform output, at the 36-step configuration, than the two or four channel systems. Its harmonic content before filtering is only about 3.5% and is readily filtered to vary low residual content for the $f_o$ desired output.

The multi-channel ($n$) inverter system of the present invention thus directly provides multi-stepped optimum output waveforms, with each cycle having $6n$ steps that are very conveniently filtered for all practical applications at the $f_o$ system frequency polyphase output. The voltage and power rating of each channel is substantially $1/n$ of the system rating. Its output transformers are efficient, and effectively isolate the SCR square wave generators from adverse operation during inductive loads. Importantly also, the summing transformers prevent the passage of direct current to the $f_o$ output (44) should a fault occur in an SCR section. This prevents damage to A.C. equipment connected to the $f_o$ line. The inverter system hereof is stable, rugged and effective. Sequential triggering circuits, monitored by an electronic clock, maintain the inverter channels in their proper time-phase displacements, providing the requisite plural polyphase current sets. Accurate monitoring from a single source permits practical parallel operation of a number of such inverters.

In the preferred arrangements, the $n$-channels of one system are time-phase and space-phase displaced into ($n-1$) equal steps within a sixty-degree spread (60°) for three-phase embodiments. This permits use of the relatively simplified sequential triggering therefor, on the ring-counter principle as described hereinabove; and similarly for other than three-phase arrays. Thus the six-channel three-phase system hereof extends from 0° to 50° with five 10° steps; the stated four-channel three-phase system, over 45° in three 15° steps; and the above-described two-channel three-phase system, by 30° in one step. Systems with a larger number of channels are indicated for the higher powers and/or lower distortion outputs.

What is claimed is:

1. An alternating current power supply system comprising a plurality of static polyphase inverters energizable by a unidirectional current source, each of said inverters providing an individual polyphase set of alternating signal trains of generally square waveform that are in symmetrical time-phase displacement within each signal set, means for maintaining the said polyphase signal sets at a predetermined common frequency and at substantially the same signal shape, means for establishing and maintaining a predetermined time-phase displacement respectively between successive of said polyphase signal sets, a polyphase output transformer individual to each of said polyphase inverters, each of said transformers having an individual primary winding in direct circuit relation with a selected signal train of its associate polyphase signal set, an individual secondary winding coupled with each of the primary windings of said transformers, and circuit means connecting the secondary windings of related signal trains among the polyphase signal sets as separate output-phase groups to establish a common polyphase alternating current with low harmonic content for the system.

2. A power supply system as claimed in claim 1, in which the secondary windings of each of said output phase groups are interconnected to series-add relationship.

3. A power supply system as claimed in claim 1 that consists of two polyphase signal inverters, which inverters have a time-phase displacement of the order of 30° between their respective polyphase signal sets.

4. A power supply system as claimed in claim 2 that consists of two polyphase signal inverters each having a three-phase signal set output, which inverters have a time-phase displacement of 30° between their respective polyphase signal sets.

5. A power supply system as claimed in claim 1, in which each of said individual polyphase output transformers is formed with a closed magnetic flux path, and at least one of said output transformers has its secondary windings in space-phase relation with their associate primary windings.

6. A power supply system as claimed in claim 5, in which the secondary windings of said other output tranformers are in predetermined space-phase displacement with respect to their associate primary windings.

7. A power supply system as claimed in claim 4, in which each of the said three-phase output transformers is formed with a closed magnetic path, one of said output transformers having its secondary windings in space-phase relation with their associate primary windings, and the secondary windings of said other output transformer are in predetermined space-phase displacement with respect to their associate primary windings.

8. A power supply system as claimed in claim 7, in which the said space-phase displacement of the windings of the other transformer is 30°.

9. A power supply system as claimed in claim 6, in which said space-phase displacements of the secondary windings with respect to their associate primary windings of the successive transformers are in substantially equal incremental amounts.

10. A power supply system as claimed in claim 9, in which said space-phase displacements between the successive transformers totals less than 60°.

11. A power supply system as claimed in claim 9, in which said time-phase displacements between the said successive polyphase signal sets is substantially the same in degrees as is the said space-phase displacements in degrees between the windings of the corresponding said successive transformers.

References Cited
UNITED STATES PATENTS

| | | | |
|---|---|---|---|
| 1,691,986 | 11/1928 | Nyquist. | |
| 3,052,833 | 9/1962 | Coolidge et al. | 321—5 |
| 3,214,671 | 10/1965 | Corey | 321—3 |
| 3,304,484 | 2/1967 | Kernick et al. | 321—5 |
| 3,324,374 | 6/1967 | Corey | 321—5 |
| 3,374,414 | 3/1968 | Garnett | 321—5 |

JOHN F. COUCH, Primary Examiner

W. H. BEHA, JR., Assistant Examiner

U.S. Cl. X.R.

321—9, 27